(12) United States Patent
Sato et al.

(10) Patent No.: US 6,549,259 B2
(45) Date of Patent: Apr. 15, 2003

(54) LIQUID CRYSTAL DISPLAY PANEL AND FABRICATION METHOD OF THE SAME

(75) Inventors: Yuko Sato, Tokyo (JP); Mitsuhiro Sugimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/780,382

(22) Filed: Feb. 12, 2001

(65) Prior Publication Data

US 2001/0013919 A1 Aug. 16, 2001

(30) Foreign Application Priority Data

Feb. 14, 2000 (JP) ........................................ 2000-035827

(51) Int. Cl.[7] ........................ G02F 1/1339; G02F 1/136
(52) U.S. Cl. .......................... 349/153; 349/155; 349/43
(58) Field of Search ............................ 349/43, 155, 84, 349/5, 153

(56) References Cited

U.S. PATENT DOCUMENTS 5,594,572 A * 1/1997 Fukutani et al. ............ 349/155
6,400,439 B1 * 6/2002 Fujioka et al. .............. 349/153
6,411,360 B1 * 6/2002 Matsuyama et al. ........ 349/156

FOREIGN PATENT DOCUMENTS

| JP | 07-128670 | 5/1995 |
|----|-----------|--------|
| JP | 08-146404 | 6/1996 |
| JP | 09-43616 | 2/1997 |
| JP | 09-179130 | 7/1997 |
| JP | 09-230361 | 9/1997 |
| JP | 10-153797 | 6/1998 |
| JP | 11-38438 | 2/1999 |
| JP | 11-109377 | 4/1999 |
| JP | 2000-56319 | 2/2000 |

* cited by examiner

*Primary Examiner*—Toan Ton
*Assistant Examiner*—Mike Qi
(74) *Attorney, Agent, or Firm*—Sughrue Mion, PLLC

(57) ABSTRACT

In a liquid crystal display panel, a gap between an array substrate 2a and an opposing substrate 3 is made constant by using spacers 23 mixed in a seal agent 22 provided around a display area A. A bottom-up pattern 17 formed in the same layer as that of a light shield 16 is formed in a seal area B and a leveling layer 19 on the seal area B is made thinner in order to minimize an amount of sink of the spacers 23 into the leveling layer 19 thereby make the gap between the substrates uniform.

20 Claims, 10 Drawing Sheets

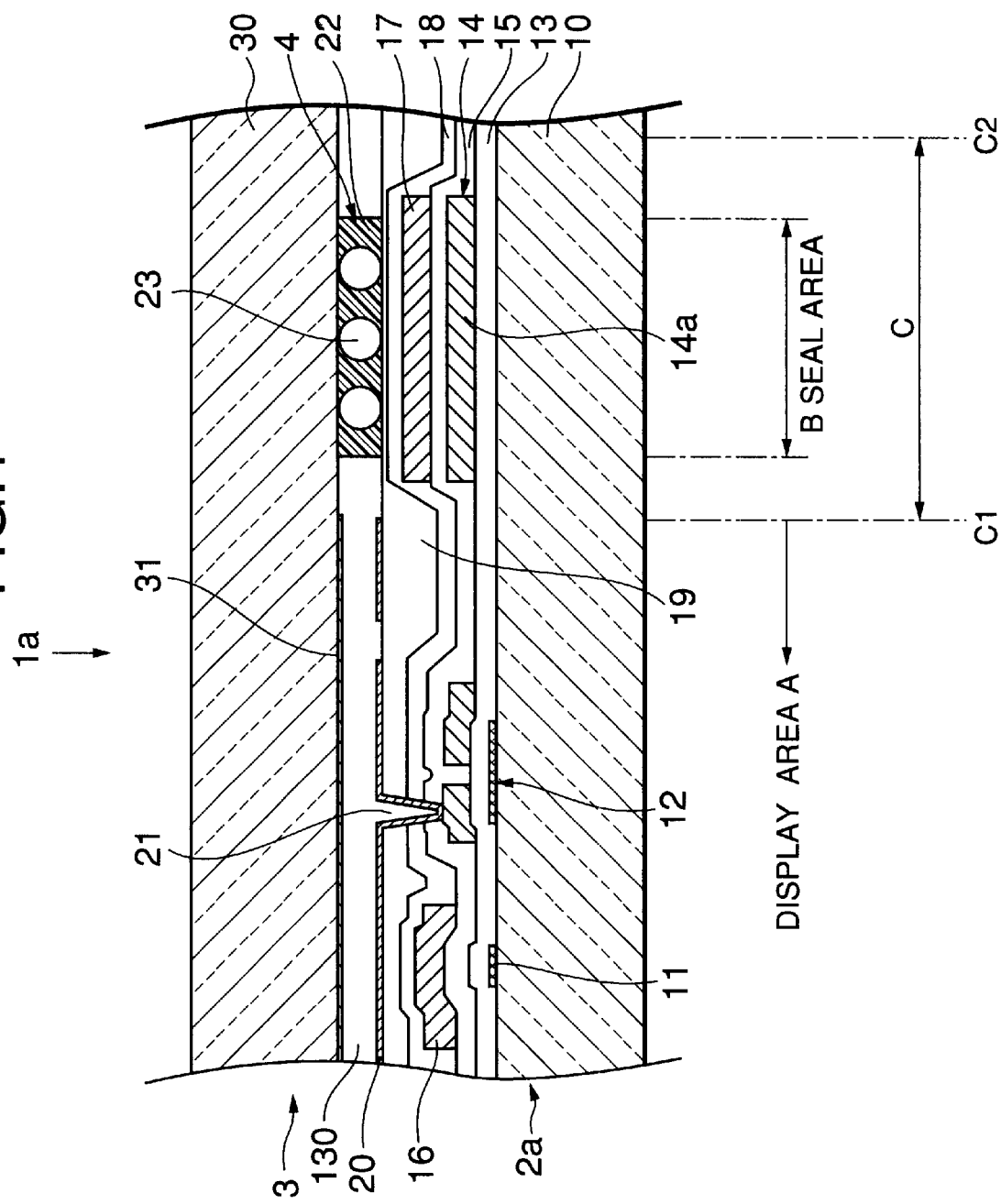

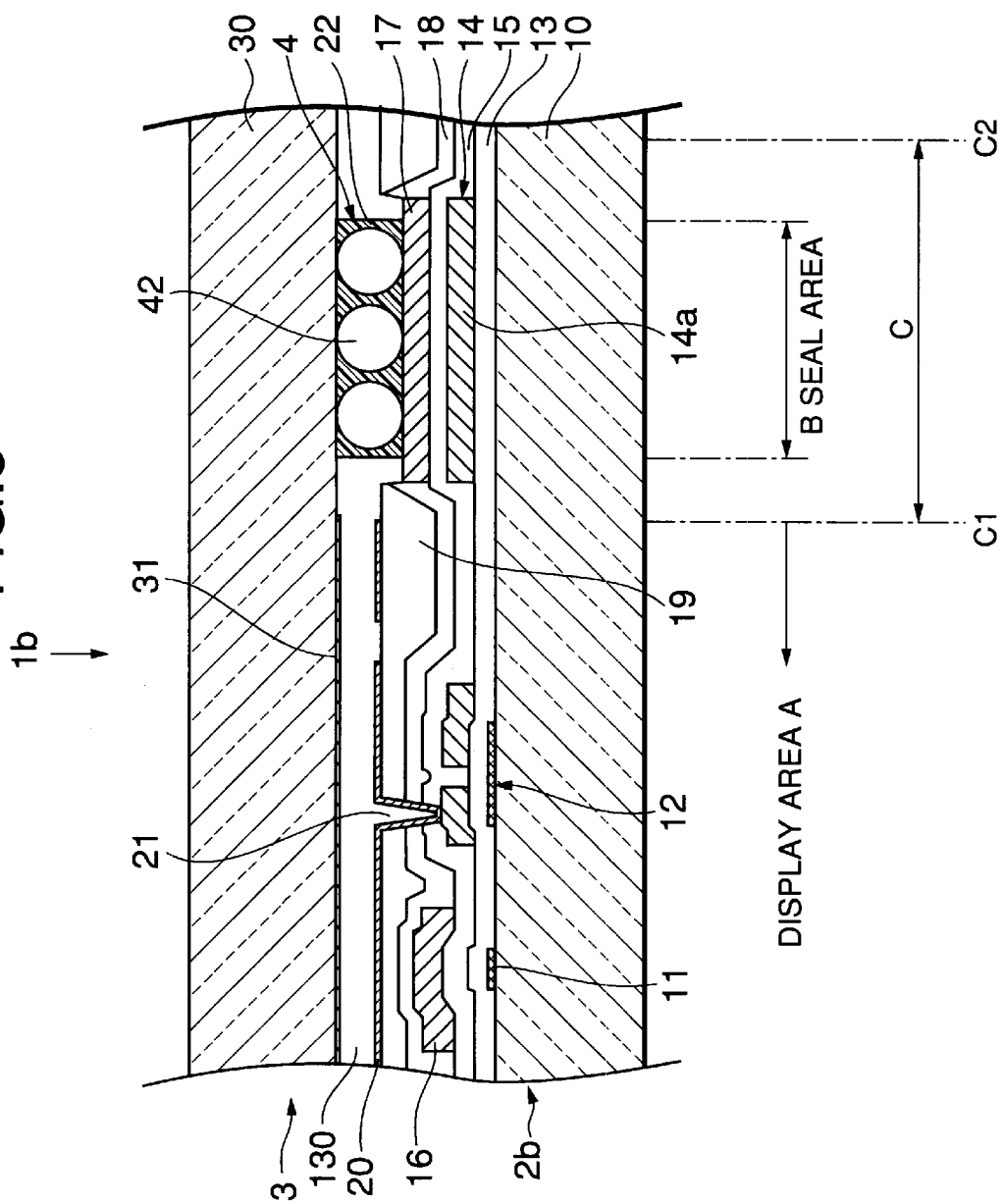

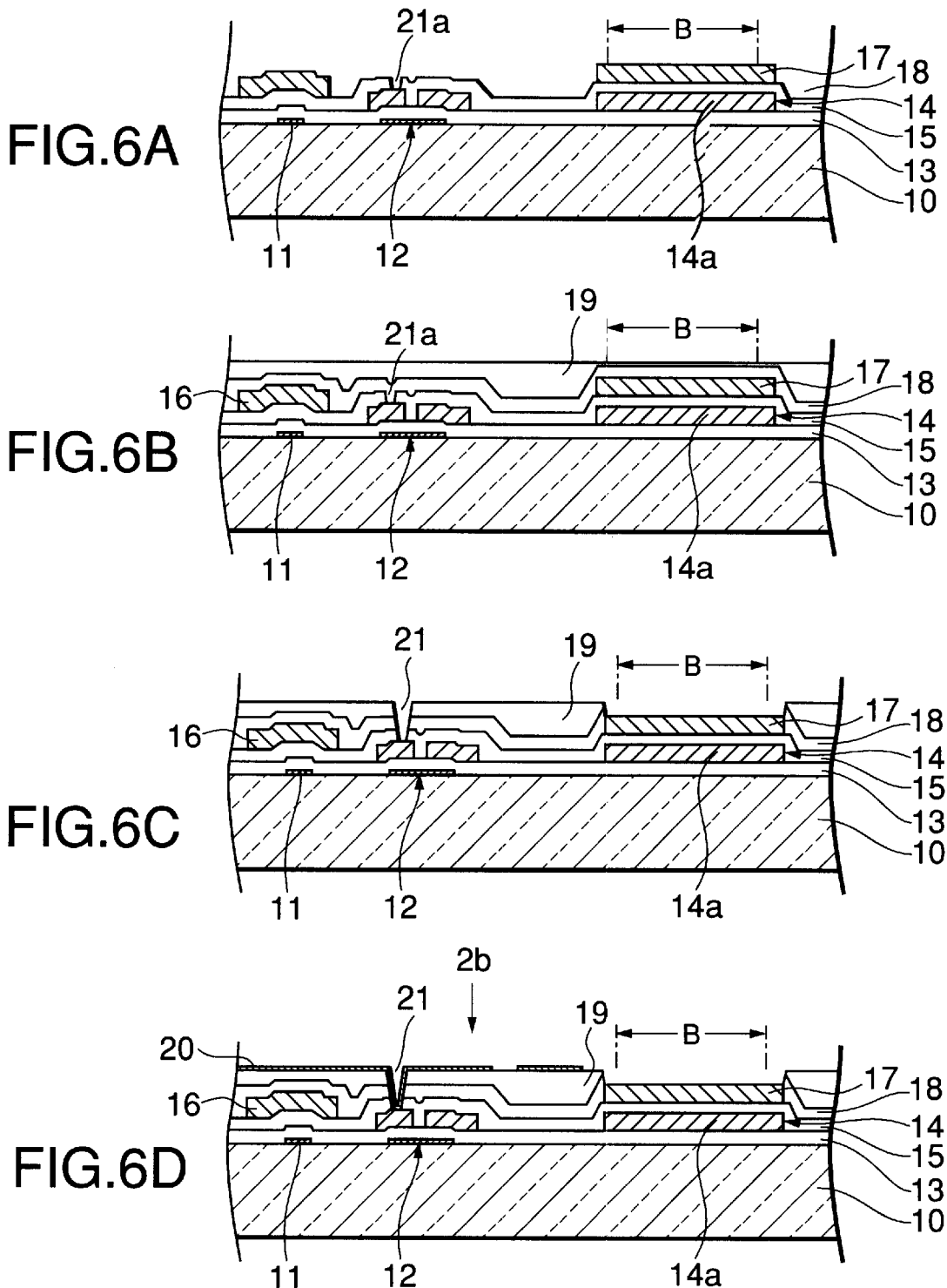

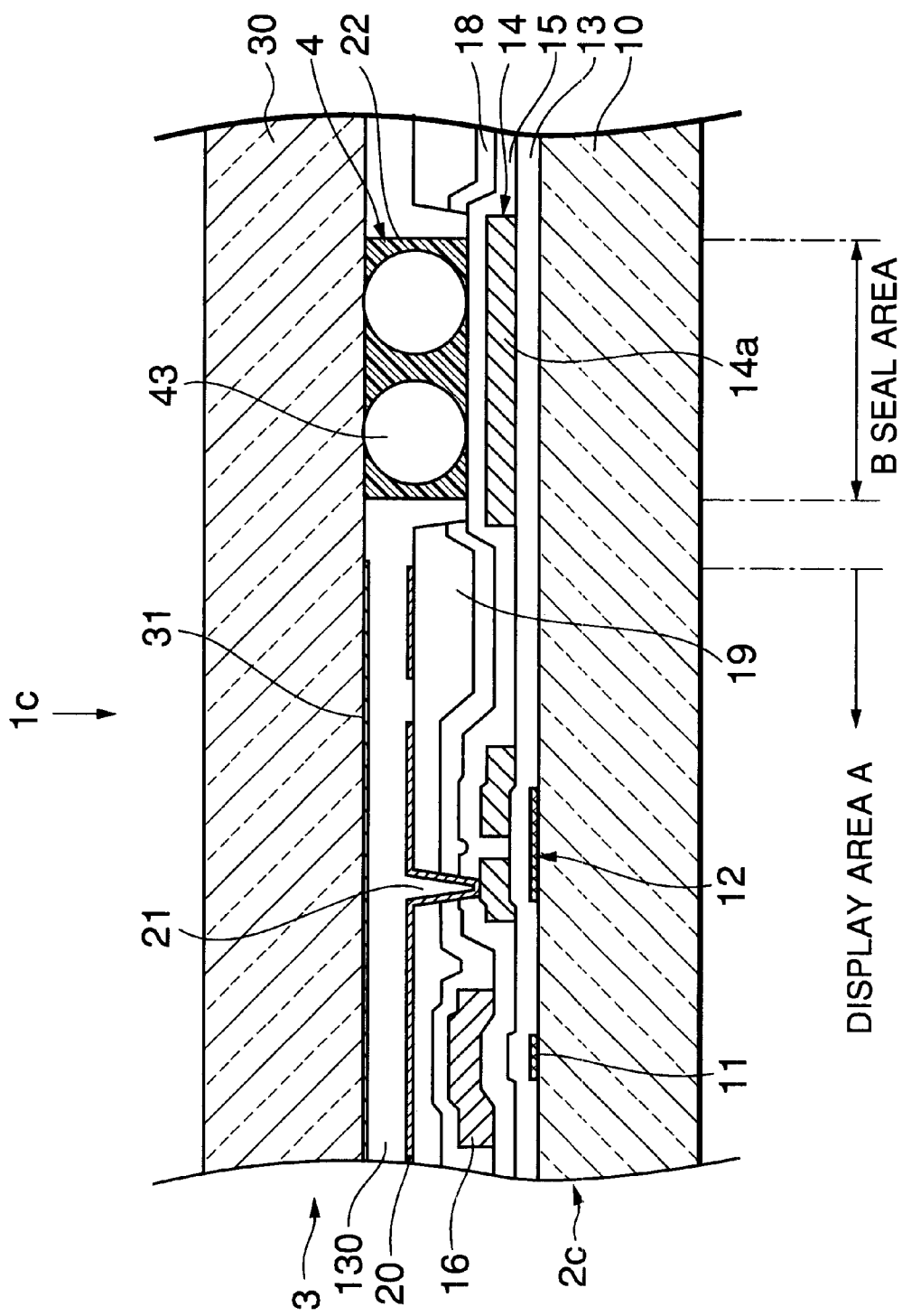

LIQUID CRYSTAL DISPLAY PANEL AND FABRICATION METHOD OF THE SAME

BACKGROUND OF THE INVENTION

1. Field of the Invention

The present invention relates to a liquid crystal display panel and a fabrication method of the same, and more particularly to an active matrix type liquid crystal display panel having a sealing member mixed with spacers.

2. Description of the Prior Art

In the active matrix type liquid crystal display panel, liquid crystal is sandwiched between an array substrate and an opposing substrate. The array substrate is provided with pixel electrodes connected to switching element, respectively. The opposing substrate is provided with an opposing electrode. The liquid crystal is sealed within a display area of the panel by using a sealing member provided at peripheral area of the panel. display area On the array substrate, a plurality of scan lines and a plurality of signal lines, which are crossing mutually, a plurality of pixel electrodes each provided in a different one of cross points of the scan lines and the signal lines, for applying voltages to the respective cross points and a plurality of switching elements such as TFT's (thin film transistors) for selectively driving the pixel electrodes are provided in matrices through patterning processes. Therefore, there may be some irregularity of an upper surface of the array substrate by the patterning processes.

On the other hand, liquid crystal filling the gap between the array substrate and the opposing substrate constitutes pixel capacitors each having the liquid crystal as a dielectric layer. The liquid crystal display is performed by controlling transmittivity of light correspondingly to electric field intensity of the pixel capacitor, to which a voltage selected by the switching element is applied, by utilizing electro-optical anisotropic property of the liquid crystal.

Therefore, the pixel capacity is varied with variation of thickness (cell gap) of the liquid crystal layer, so that intensity of display is varied. In order to obtain a uniform display quality throughout the display area, it is necessary to improve uniformity of the cell gap throughout the display area. Under the circumstance, various endeavors to uniform the cell gap have been continuing in the technical field to which the present invention belongs.

It has been usual, in order to uniform the cell gap, to use gap maintaining members (spacers) for maintaining the gap between the array substrate and the opposing substrate. As a method for providing the spacers between the array substrate and the opposing substrate, it is usual to arrange them in the liquid crystal in the display area and/or mix them in the seal provided around the display area.

In the case where the spacers are provided in the display area, the spacers may adversely affect the display characteristics. Therefore, this method is not preferable when high display quality is required. That is, in order to constitute a liquid crystal display panel having high display quality, it is effective to maintain the gap between the substrates by removing the spacers arranged in the display area or reducing the number of the spacers.

Furthermore, the variation of the cell gap, which is caused by the surface irregularity of the array substrate resulting from the patterning process, is improved by coating the patterned surface of the array substrate with a soft leveling layer.

FIG. 10 is a partial cross section of a conventional liquid crystal display panel 101 of the type in which a leveling layer is formed on an array substrate and gap retaining members (spacers) are provided in a seal in a mixed relation thereto.

The liquid crystal display panel 101 includes the array substrate 102 as shown in FIG. 10. The array substrate 102 includes a transparent glass substrate 10 and a gate line 11 and a switching element 12 are formed on the transparent glass substrate 10 by patterning. An oxide layer 13, a metal wiring layer 14, the first interlayer insulating layer 15, a light shielding layer 16 and the second interlayer insulating layer 18 are formed on the wafer in the order to constitute a laminated structure including predetermined lamination patterns on the transparent glass substrate 10. A portion of the metal wiring layer 14 constitutes lead wiring lines 14a.

As shown in FIG. 10, the patterned surface of the array substrate 102, which is the surface of the second interlayer insulating layer 18 in the shown case, becomes irregular. Forming a leveling layer 19 thereon by using spin coating method flattens the patterned, irregular surface of the array substrate 102. On an upper surface of the leveling layer 19, a pixel electrode 20 of ITO (Indium Tin Oxide) is formed. That is, the pixel electrode 20 is an electrically conductive transparent thin layer discretely provided every pixel. The pixel electrode 20 is connected to the metal wiring layer 14 through a contact hole 21 so that the pixel electrode is connectable to the switching element 12.

On the other hand, the liquid crystal display panel 101 includes an opposing substrate 3 as shown in FIG. 10. The opposing substrate 3 is constituted with a transparent glass substrate 30 and at least an opposing electrode 31 formed thereon. It is usual that a light shielding layer and, in a case of a color liquid crystal display device, R, G and B color layers are additionally formed on the transparent glass substrate 30.

After the array substrate 102 and the opposing substrate 3 are completed, respectively, the liquid crystal display panel 101 is assembled. First, a sealing agent 22 is printed on an outer peripheral portion of a display area of either the array substrate 102 or the opposing substrate 3 to seal liquid crystal 130 within a display area. The printing of the sealing agent is performed by the drawing printing in which it is drawn with a single stroke of a seal dispenser or the screen printing. Spacers 23 of a glass material are preliminarily mixed in the sealing agent 22. The sealing agent 22 may be formed of ultraviolet ray setting resin or thermosetting resin.

After the sealing agent printing step, the substrates are stuck together. First, one of the substrates is laid on top of the other and the substrates are positioned such that corresponding cells of the substrates become in opposing relations, respectively. Thereafter, the substrates are pressed by pressing plates to exert pressure on the sealing agent 22 and the spacers 23 to thereby regulate the gap between the substrates to a predetermined value. During this pressing state, the seal agent 22 is hardened. In a case where a ultraviolet setting resin is used as the material of the sealing agent 22, the pressing plates are formed of a material which is transparent for ultraviolet ray and the seal agent 22 is hardened by irradiating the sealing agent 22 with ultraviolet ray through the pressing plates. In a case where a thermosetting resin is used as the material of the sealing agent 22, the seal agent 22 is hardened by heating the sealing agent 22 by a heater provided in the pressing plate or by disposing the liquid crystal display panel in an oven and heating air within the oven.

The liquid crystal display panel 101 which includes the array substrate 102 and the opposing substrate 3 piled on the array substrate and adhered to the array substrate 102 by the seal 4, which contains the spacers 23 and is provided on the outer periphery of the display area A of either one of the array substrate 102 and the opposing substrate 3, is constituted as shown in FIG. 10. The seal 4 is formed of the sealing agent 22 and the spacers 23 mixed therein. The gap between the array substrate 102 and the opposing substrate 3 is maintained uniform owing to the spacers 23. It should be noted that a seal area B is also shown in FIG. 10. The seal area B indicates a common area of the substrates and a space of the gap therebetween, which is covered by the seal 4 provided on either one of the substrates.

There are problems in the above-mentioned conventional technique, which will be described below.

An organic soft material is used for the leveling layer 19. For example, acrylic resin (diethylene glycol ethyl methyl ether) or BCB (benzocyclobutene) is used therefor. On the other hand, the spacer 23 usually takes in the form of a rod or spherical particle of a glass material. Further, the insulating layer (the second interlayer insulating layer 18 in the case shown in FIG. 10), which is an underlying layer of the leveling layer, is formed of a silicon compound such as SiN. That is, the spacers 12 and the underlying layer of the leveling layer are softer than the leveling layer. Therefore, when the array substrate is laid on the top of the opposing substrate and pressed together by the pressing plates, the spacers 23 sink into the leveling layer 19 as shown in FIG. 10. If an amount of sink is uniform throughout the liquid crystal display panel 101, there is no problem in view of the uniformity of cell gap.

However, the amount of sink throughout the panel usually becomes not uniform and tends to be different every portion thereof. When the amount of sink is different every portion, the cell gap in the display area of the liquid crystal display panel varies. As a result, color variation occurs on the display surface, causing the display quality to be degraded.

For a liquid crystal display panel to be used in a projection type liquid crystal display (projector), in which compactness and high display quality of are required, there is a case in which any spacer is not arranged in a display area of the panel and the cell gap is retained by only spacers mixed in the seal. In such case, the influence of the above mentioned problem is considerable.

In view of improvement of producibility of the liquid crystal display panel, it is usual in the recent fabrication method of liquid crystal display panels, to constitute a plurality of liquid crystal display panels on a large substrate and separate them by cutting in a certain step of the fabrication method. This method will be referred to as "multi-panel method", hereinafter. The smaller the size of liquid crystal display panel provides the more the number of liquid crystal display panels to be fabricated on a common substrate. There is a case where several tens liquid crystal display panels are fabricated on a common substrate. For example, there is a case, in the multi-panel method, where 64 liquid crystal display panels are formed on a 300 mm×350 mm substrate simultaneously.

In such multi-panel method, the array substrates as well as the opposing substrates are formed simultaneously on a large substrate provided with a plurality of small substrates, which are arranged in matrix, each corresponding to a unit liquid crystal display panel. When a leveling layer is coated on the large substrate, thickness of the leveling layer becomes different depending upon areas of the large substrate, that is, positions of the small substrates on the large substrate. When the large substrate including the small substrates corresponding to the array substrates are laid on top of the large substrate including the opposing substrates and the large substrates are pressed together, the cell gap varies every small substrate, that is, the liquid crystal display panel, resulting in that the rate of defective products in the plurality of liquid crystal display panels produced from the same large substrates becomes large, that is, the yield, is lowered.

SUMMARY OF THE INVENTION

Accordingly, an object of the present invention is to provide a liquid crystal display panel having improved uniformity of cell gap and providing high display quality throughout an image display area thereof.

Another object of the present invention is to provide a method for fabricating the same liquid crystal display panel.

According to the present invention, a liquid crystal display panel comprises a seal member sandwiched between an array substrate and an opposing substrate and a liquid crystal is filled therebetween. The seal member contains spacers in a mixed state for maintaining a gap between the array substrate and the opposing substrate constant. The array substrate is provided with a leveling layer formed such that it covers a switching element array. In order to restrict an amount of sink of the spacers into the leveling layer in an area of the seal member, the leveling layer includes either a thin layer portion thinner than the leveling layer on each switching element of the switching element array or an opening portion.

Particularly, the liquid crystal display panel according to the present invention has a basic structure featured by that an array substrate and an opposing substrate are stuck together such that a seal member containing spacers is provided around a display area of the substrates so as to make a gap between the array substrate and the opposing substrate constant. At least switching elements, a wiring layer and a light shielding layer are formed on the display area of the array substrate as a laminated pattern. The leveling layer is coated on the laminated pattern and pixel electrodes formed on the leveling layer are electrically connected to the respective switching elements through contact holes.

In such liquid crystal display panel, the present invention is featured by that, in order to restrict the sink of the spacers into the leveling layer, the leveling layer includes either thin layer portions or openings are formed.

In an example of the present invention, a bottom-up pattern layer for making an underlying layer of the leveling layer higher is laminated on the seal area of the array substrate. In the case of the liquid crystal display panel 101 shown in FIG. 10, the underlying layer of the leveling layer corresponds to the second interlayer insulating layer 18.

With such construction including the bottom-up pattern layer laminated on the seal area of the array substrate, the level of a lower surface of the leveling layer becomes higher by an amount corresponding to the thickness of the bottom-up pattern layer, so that the thickness of the leveling layer on the seal area can be reduced. Therefore, it is possible to reduce or eliminate the amount of sink of the spacers mixed in the seal into the leveling layer. With reduction or elimination of the amount of sink of the spacers into the leveling layer, the uniformity of sink of the spacers is improved. As a result, the uniformity of cell gap is improved, so that it is possible to maintain the display quality high throughout the image display area.

Furthermore, since the influence of the leveling layer in the seal area is small in even the multi-panel method, there is a merit that the variation of cell gap of every liquid crystal display panel is restricted, so that the yield is improved.

It has been usual that lead wiring layers and insulating layers are laminated on the seal area of the array substrate and the height of the underlying layer of the leveling layer in the seal area is increased thereby. The purpose of the lead wiring layers is to provide an electrically connection to external drive circuits and the purpose of the insulating layers is to electrically insulate between wiring layers. In the present invention, however, the purpose of the bottom-up pattern layer is to raise the underlying layer of the leveling layer. That is, the bottom-up pattern layer is not used for other purpose.

According to the second example of the present invention, the liquid crystal display panel is featured by a construction in which the level of the underlying layer of the leveling layer in the seal area is made substantially equal to a surface of the leveling layer.

In the second example, it is possible to make the thickness of the leveling layer in the seal area very small compared with the average thickness of the leveling layer formed in the display area to thereby substantially restrict the amount of sink of the spacers into the leveling layer. As a result, it is possible to further improve the uniformity of the cell gap and to reliably maintain high display quality throughout the image display area. Even in the multi-panel method, the variation of cell gap of every liquid crystal display panel is restricted and the yield is improved, since the influence of the leveling layer in the seal area is small.

According to the third example of the present invention, the liquid crystal display panel is featured by that the underlying layer of the leveling layer is exposed on the surface of the array substrate in the seal area and the spacers are made in contact with the exposed surface and supported thereby.

That is, in the third example of the liquid crystal display panel, no leveling layer is formed on the seal area in coating the leveling layer or the leveling layer on the seal area is removed after the leveling layer is coated.

In the liquid crystal display panel according to the third example in which there is no leveling layer formed on the seal area and the spacers are in direct contact with the underlying layer of the leveling layer, there is no sink of the spacers into the leveling layer and the uniformity of the cell gap is improved. Therefore, it is possible to reliably maintain high display quality throughout the image display area. Even in the multi-panel method, the variation of cell gap of every liquid crystal display panel is restricted and the yield is improved, since there is no influence of the leveling layer in the seal area.

According to the fourth example of the present invention, the liquid crystal display panel having the construction according to the third example is featured by that a bottom-up pattern layer for level-up of the underlying layer is formed on the seal area of the array substrate.

Therefore, according to the fourth example, there is a merit that a plane for supporting the spacers is not lowered by a value corresponding to the thickness of the bottom-up pattern layer without leveling layer on the seal area of the array substrate, in addition to the merit of the construction according to the third example.

The bottom-up pattern layer may be formed in any of layers constituting the underlying layer of the leveling layer. In fabricating the liquid crystal display panel of the present invention, it may be possible to provide specific forming and patterning processes for the bottom-up pattern layer. However, it is preferable, in view of restriction of increase of the number of fabrication steps, that is, increase of the fabrication cost, to form the bottom-up pattern by utilizing one of the existing patterning processes.

According to the fifth example of the present invention, the liquid crystal display panel having the construction according to the first or fourth example is featured by that the bottom-up pattern layer is in the same layer as that of a predetermined patterned layer formed on the display area of the liquid crystal display panel.

According to the fifth example, it is possible to form the bottom-up pattern layer by utilizing the existing forming and patterning process, without increase of the number of fabrication steps and the fabrication cost.

According to the sixth example of the present invention, the liquid crystal display panel having the construction according to the first or fourth example is featured by that the bottom-up pattern layer is in the same layer as that of the light shielding layer of the display area of the panel.

In the seal area of the panel, there is no need of shielding light by means of the light shielding layer formed in the liquid crystal display panel. In the display area, however, it is necessary to shield the switching elements and the wiring layers against light by providing the light shielding layer of aluminum or aluminum alloy in a periphery of each pixel. In the construction of the liquid crystal display panel according to the sixth example of the present invention, the bottom-up pattern layer is formed by utilizing the forming and patterning process for the light shielding layer of the display area.

According to the seventh example of the present invention, the liquid crystal display panel having the structure according to any of the first to third examples is featured by that the leveling layer is formed of a material having hardness lower than those of the spacers and the underlying layer of the leveling layer.

When hardness of the leveling layer is lower than that of the spacers, the spacers tend to sink into the leveling layer, compared with a case where hardness of the leveling layer is higher than that of the spacers, and, therefore, it is effective to form the underlying layer having hardness higher than that of the leveling layer as in the display panel according to any one of the first to third examples of the present invention. The construction of the liquid crystal display panel according to the seventh example of the present invention results from the above consideration and is effective when the spacers are formed of glass material, the underlying layer of the leveling layer is formed of a silicon compound such as SiN and the leveling layer is formed of a resin material as in the conventional case in which hardness of the leveling layer is lower than those of the spacers and the underlying layer.

According to the eighth example of the present invention, the liquid crystal display panel having the construction according to the first or fourth example is featured by that the bottom-up pattern layer is formed of an electrically conductive material, a plurality of parallel lead wiring lines traversing the seal area are provided in a layer in a level of the layer including the bottom-up pattern layer and an interlayer insulating layer therebetween and the bottom-up pattern layer is cut off at a gap between the lead wiring lines.

That is, according to the construction mentioned above, the reliability of electrical insulation is improved even when the bottom-up pattern layer is formed of an electrically conductive material, since the bottom-up pattern layer is cut off at the gap area between the lead wiring lines.

According to the ninth example of the present invention, the liquid crystal display panel having the construction according to the eighth example is featured by that a distance of the cut-off portion of the bottom-up pattern layer is smaller than a diameter of the spacer.

Therefore, the sink of the spacers into the leveling layer in the ninth example is restricted even in the cut-off portion of the bottom-up pattern layer. When there is no leveling layer in the seal area, the spacers are prevented from dropping in the gap area or cut-off area of the bottom-up pattern. Therefore, the effect of the first invention is obtained reliably throughout the seal area. Further, there is a merit that the uniformity of the cell gap can be improved by effectively functioning an increased number of spacers as the gap maintaining members.

According to the tenth example of the present invention, the liquid crystal display panel having the construction according to one of the first, fourth and eighth examples is featured by that a plurality of parallel lead wiring lines traversing the seal area are provided and the bottom-up pattern layer is formed in the same layer as that of the lead wiring lines and on the gap area between the lead wiring lines.

Therefore, according to this construction, it is possible to relax irregularity caused by the lead wiring lines and to further flatten the laminated pattern for supporting the spacers in the seal area. Consequently, it is possible to make the level of the spacers of the respective panels more flat with respect to the substrate to thereby improve the uniformity of the cell gap by effectively functioning more spacers as the gap maintaining members.

According to the eleventh example of the present invention, the liquid crystal display panel having the construction according to the fourth example is featured by that the seal is adhered to the bottom-up pattern layer and the bottom-up pattern layer is formed with slits.

Therefore, according to this construction, there is a merit that adhesiveness of the seal is improved since the seal agent enters into the slit of the bottom-up pattern layer.

According to the twelfth example of the present invention, the liquid crystal display panel having the construction according to the eleventh example is featured by that a width of the slit is smaller than the diameter of the spacer.

Therefore, this construction has a merit that it is possible to improve the uniformity of the cell gap by effectively functioning an increased number of spacers as the gap maintaining members, since the spacers are prevented from dropping in the slit of the bottom-up pattern layer.

A fabrication method for fabricating the liquid crystal display panel according to the present invention will be described next.

The first fabrication method of the present invention, for fabricating the above described liquid crystal display panel comprises, basically, the patterning steps of forming at least switching elements, wiring lines and a light shielding layer on a transparent substrate, the leveling layer coating step of forming a leveling layer on a surface of a wafer on which the patterns are formed in the patterning steps, the step of forming pixel electrodes on the leveling layer and the step of providing a seal containing spacers in mixed state. In this basic fabrication method of the liquid crystal display panel, the present invention is featured by that a bottom-up pattern layer for increasing height of an underlying layer of the leveling layer is formed in a seal area on the transparent substrate. Further, the present invention is featured by the etching step of forming contact holes in the leveling layer by etching, before the pixel electrodes are formed.

According to the second fabrication method of the present invention, the basic fabrication method is featured by that a portion of the leveling layer, which is coated on the seal area is removed by etching.

According to the third fabrication method of the present invention, the fabrication method according to the first aspect is featured by that a portion of the leveling layer, which is coated on the seal area is removed by etching.

According to the fourth fabrication method of the present invention, the first fabrication method is featured by that the bottom-up pattern layer is formed by utilizing any one of the patterning steps.

According to the fifth fabrication method of the present invention, the fabrication method according to the first fabrication method is featured by that the bottom-up pattern layer is formed by utilizing the light shielding layer forming step of the patterning steps.

According to the sixth present fabrication method of the present invention, the second or third fabrication method is featured by that the leveling layer coated on the seal area is etched away by the etching step of forming the contact holes.

According to the sixth fabrication method of the present invention, there is a merit that the fabrication cost is not increased since the existing etching process is utilized.

BRIEF DESCRIPTION OF THE DRAWINGS

This above mentioned and other objects, features and advantages of the present invention will become more apparent by reference to the following detailed description of the invention taken in conjunction with the accompanying drawings, wherein:

FIG. 1 illustrates a cross section of a liquid crystal display panel 1a according to the first embodiment of the present invention;

FIG. 5 illustrates a cross section of a liquid crystal display panel 1b according to the second embodiment of the present invention;

FIG. 6A to FIG. 6D are cross sections of an array substrate 2b of the second embodiment shown in FIG. 5, showing fabrication steps of thereof, respectively;

FIG. 8 illustrates a cross section of a liquid crystal display panel 1c according to the third embodiment of the present invention;

DETAILED DESCRIPTION OF THE PREFERRED EMBODIMENTS

A liquid crystal display panel according to the present invention and a fabrication method thereof will be described.

Figure 9:
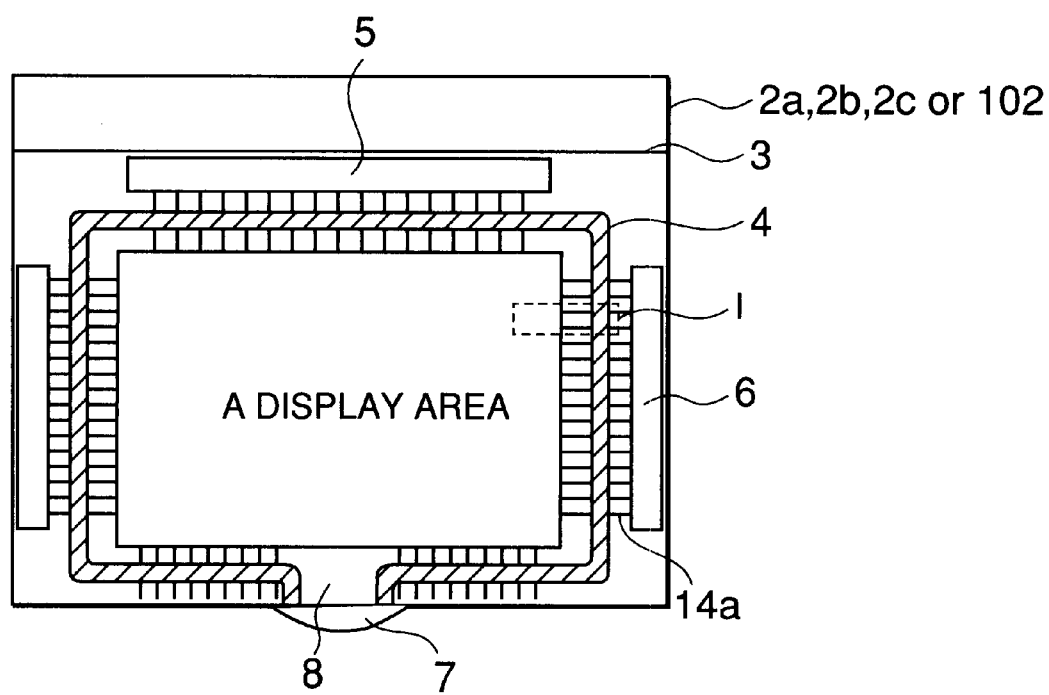
FIG. 9 is a partially removed plan view of an example of a liquid crystal display panel to which the present invention is applied, showing inside main modules.

FIG. 9 is a schematic plan view of an example of the liquid crystal display panel to which the present invention can be applied, with an upper member being removed to show main modules behind the member. A cross section of a portion depicted by a letter I shown in FIG. 9, which includes a seal 4 and a display area A, is shown in FIG. 1, FIG. 5, FIG. 8 or FIG. 10.

As shown in FIG. 9, the liquid crystal display panel is of the liquid crystal injection type.

That is, a narrow gap is defined between an array substrate (2a, 2b, 2c or 102) and an opposing substrate 3 and the seal 4 is provided in the gap such that it substantially surrounds the center display area A. The seal has an opening at one position (at around a center of a lower side of the seal 4 in FIG. 9) to form a liquid crystal injection hole 8. After liquid crystal 130 is injected into the gap, the liquid crystal injection hole 8 is closed by sealing agent 7. Lead wiring lines 14a are formed such that the lead wiring lines extend from four sides of the display area A outwardly. A drive circuit 5 is provided on an upper portion of the panel outside the seal 4 and a pair of drive circuits 6 are provided on a left and right portion of the panel outside the seal 4. The lead wiring lines 14a extending from an upper side of the display area A are connected to the drive circuit 5 and the lead wiring lines 14a extending from a left side of the display area A are connected to one of the drive circuit 6. The lead wiring lines 14a extending from the right side of the display area A are connected to the other drive circuit 6. The lead wiring lines extending from the lower side of the display area A are dummy leads which are not connected to any drive circuit and have no function as wiring lines. The dummy lead wiring lines 14a are provided to maintain the gap between the array substrate (2a, 2b, 2c or 102) and the opposing substrate 3 constant.

Embodiment 1

A liquid crystal display panel 1a according to the first embodiment of the present invention will be described with reference to FIG. 1, which is a cross section of the portion I shown in FIG. 9.

Figure 10:
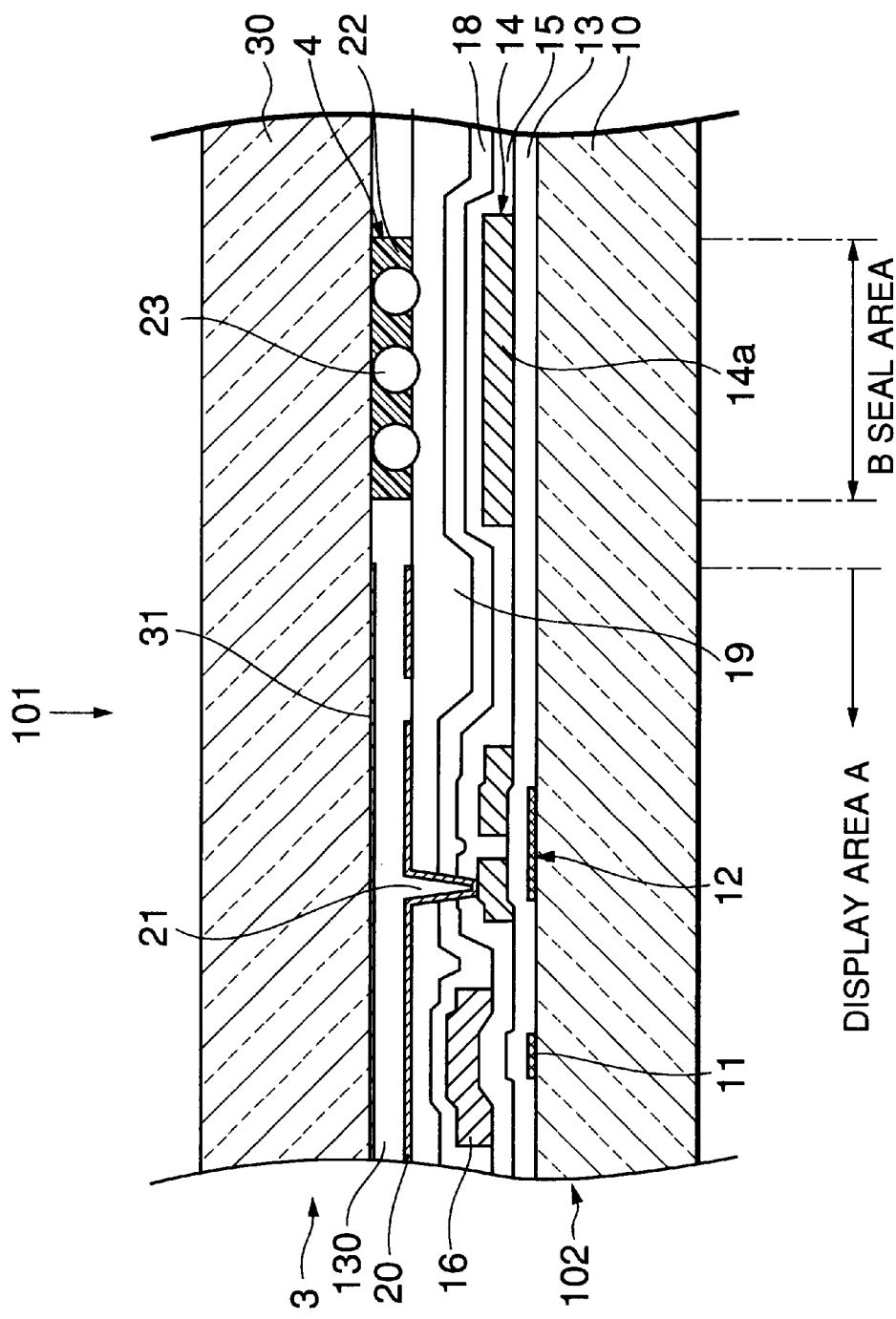
FIG. 10 is a cross section of an example of a conventional liquid crystal display panel 101 having a leveling layer 19 formed on an array substrate 102 and a seal 4 containing spacers 23 in a mixed state.

As shown in FIG. 1, the liquid crystal display panel 1a according to the first embodiment of the present invention has substantially the same construction as the conventional liquid crystal display panel 101 shown in FIG. 10.

That is, similarly to the conventional liquid crystal display panel 101, the liquid crystal display panel 1a has a structure in which an array substrate 2a lies on top of an opposing substrate 3 with a seal 4 disposed therebetween to seal a liquid crystal 130 within a display area. The seal 4 contains spacers 23 of a glass material in mixed state. The opposing substrate 3 is constructed with a glass substrate 30 and an opposing electrode 31 formed thereon similarly to the conventional opposing substrate.

The array substrate 2a has a similar construction to that of the array substrate 102 of the conventional liquid crystal display panel. That is, it has a laminated pattern structure formed on a transparent glass substrate 10, which includes gate lines 11, switching elements 12, an oxide layer 13, a metal wiring layer 14, the first interlayer insulating layer 15, a light shielding layer 16 and the second interlayer insulating layer 18, all of which are formed in the order by patterning steps, respectively. A portion of the metal wiring layer 14 constitutes the lead wiring lines 14a. A leveling layer 19 is formed on the laminated pattern by coating and pixel electrodes 20 formed on the leveling layer 19 are connected to the metal wiring layer 14 through contact holes 21, respectively, so that the pixel electrodes 20 are electrically connected to the switching elements 12, respectively.

However, the array substrate 2a of the liquid crystal display panel 1a differs from the conventional array substrate 102 in that a bottom-up pattern 17 is formed on the first interlayer insulating layer 15 in a seal area B. With the provision of the bottom-up pattern 17 in the seal area B, a vertical level, that is, the height, of an underlying layer of the leveling layer 19 in the seal area B is increased by a value corresponding to thickness of the bottom-up pattern layer 17 compared with the conventional array substrate 102. As a result, the underlying layer becomes a land in the seal area.

In the construction shown in FIG. 1, the height of the underlying layer of the leveling layer 19 is determined by the height of an upper surface of the second interlayer insulating layer 18. Since the height of the underlying layer of the leveling layer 19 in the seal area B is increased, the level of a bottom of the leveling layer 19 raises, so that the thickness of the leveling layer 19 in the seal area B is reduced. That is, in the array substrate 2a of the liquid crystal display panel 1a according to the first embodiment, the thickness of the leveling layer 19 in the seal area B is smaller than that of the conventional array substrate 102 by a value corresponding to the thickness of the bottom-up pattern layer 17. The thickness of the thinner portion of the leveling layer 19 is preferably smaller than the thickness of the leveling layer on the light shielding layer 16.

In the liquid crystal display panel 1a according to the first embodiment, the amount of sink of the spacer 23 contained in the seal agent 22 into the leveling layer 19 is reduced. Therefore, according to the liquid crystal display panel 1a, the uniformity of sink amount of the spacers 23 is improved, so that the uniformity of the cell gap is improved. Consequently, it becomes possible to maintain the high display quality throughout the image display screen.

In order to maintain the display quality at high level, it is preferable to make the leveling layer 19 in the seal area B thinner. In order to realize this, it is preferable to set the height of the underlying layer of the leveling layer 19 in the seal area B such that the upper surface of the underlying layer becomes substantially coplanar with the upper surface of the leveling layer 19, as shown in FIG. 1. With such setting of the height of the underlying layer, it becomes possible to make the thickness of the leveling layer 19 in the seal area B very small.

Furthermore, in the liquid crystal display panel 1a according to the first embodiment, the bottom-up pattern layer 17 is in the same layer as that of the light shielding layer 16 of the laminated structure, so that the bottom-up pattern layer 17 can be formed by utilizing the same patterning process for the light shielding layer 16 without requiring an additional patterning step. It should be noted that the bottom-up pattern layer 17 may be in the same layer as other layer of the laminated structure than the light shielding layer 16.

In the liquid crystal display panel 1a according to the first embodiment, the spacers 23 are formed of a glass material, the second interlayer insulating layer 18 is formed of silicon nitride (SiN) and the leveling layer 19 is formed of a resin material. As a result, the hardness of the leveling layer 19 is lower than that of the spacers 23 as well as the second interlayer insulating layer 18.

Therefore, when the array substrate 2a and the opposing substrate 3 are piled and pressed together by a pressure plate, the spacers 23 tend to sink into the leveling layer 19.

However, since the thickness of the leveling layer 19 in the seal area B is very small, there is substantially no sink of the spacers 23 into the leveling layer 19 and the uniform cell gap is maintained throughout the image screen.

Now, a fabrication method for fabricating the liquid crystal display panel 1a according to the first embodiment will be described with reference to FIG. 2A to FIG. 2D, which are cross sections in the respective steps in fabricating the array substrate 2a of the liquid crystal display panel.

In the forming process of TFT's as the switching elements 12, a semiconductor layer (not shown) of such as polysilicon, which becomes an active layer, and a $SiO_2$ layer (not shown) as the gate insulating layer are formed and the gate electrodes (not shown) and the gate lines 11 are formed by forming a silicide layer such as tungsten silicide ($WSi_2$) by sputtering. Thereafter, a source•drain region (not shown) is formed in the semiconductor layer by ion injection. Thus, the TFT's each about 180 nm thick is formed.

The oxide layer 13 about 400 nm thick is formed thereon by CVD and the contact holes (not shown) for electrically connecting the metal wiring layer 14 to the source•drain regions of the TFT's are formed in the oxide layer 13 by etching. Further, the metal wiring layer 14 is formed by forming a about 50 nm thick low resistance metal layer of such as aluminum on the oxide layer 13 by sputtering.

Figure 2A:
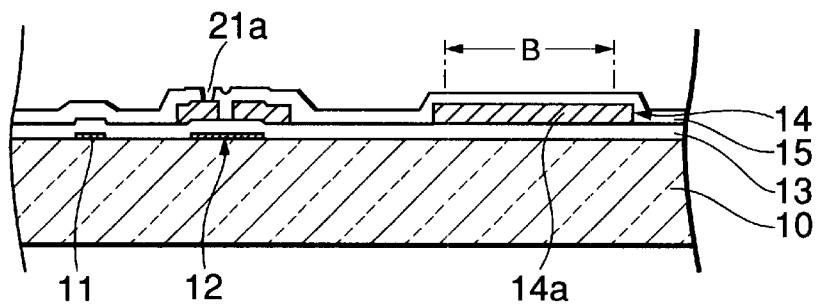
FIG. 2A to FIG. 2D are cross sections of an array substrate 2a of the first embodiment shown in FIG. 1, showing fabrication steps of thereof, respectively.

Moreover, the first interlayer insulating layer 15 is formed by forming a SiN layer about 400 nm thick on the metal wiring layer 14 by CVD and, then, an opening portion 21a is formed in the first interlayer insulating layer 15 by etching, resulting in the structure shown in FIG. 2A.

Figure 2B:
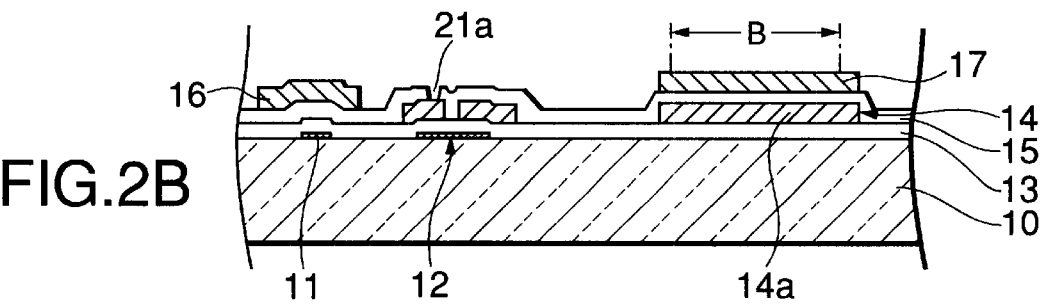

Thereafter, as shown in FIG. 2B, an aluminum layer about 500 nm thick, which has light shielding property, is formed by sputtering and the light shield 16 and the bottom-up pattern 17 are formed by patterning the aluminum layer to a predetermined pattern. In this patterning step the bottom-up pattern 17 is formed in only the seal area B. Describing this in more detail, after the aluminum layer is formed by sputtering, a photo resist is coated thereon, exposed and developed. When the photo resist is of the positive type, a portion of the photo resist on the seal area B is not exposed and, when the photo resist is of the negative type, the portion of the photo resist is exposed. Thereafter, the exposed photo resist is developed to form a resist pattern (not shown) for forming the light shield covering the seal area B. The aluminum layer is etched by using the thus formed resist pattern to simultaneously form the light shield 16 and the bottom-up pattern 17.

Figure 2C:
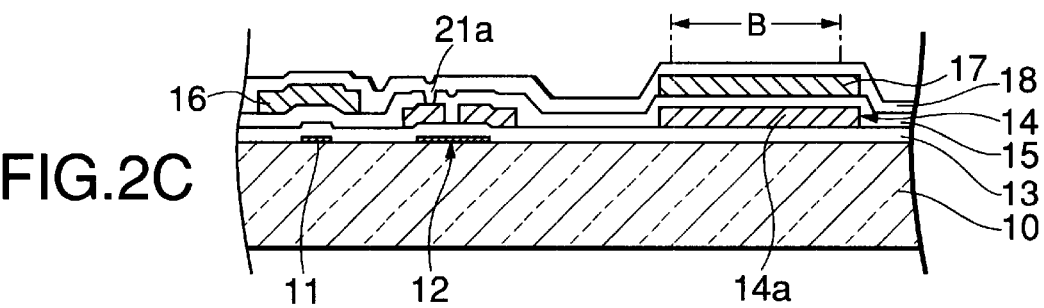

Thereafter, as shown in FIG. 2C, a SiN layer about 500 nm thick is formed on the wafer by CVD to form the second interlayer insulating layer 18.

Figure 2D:
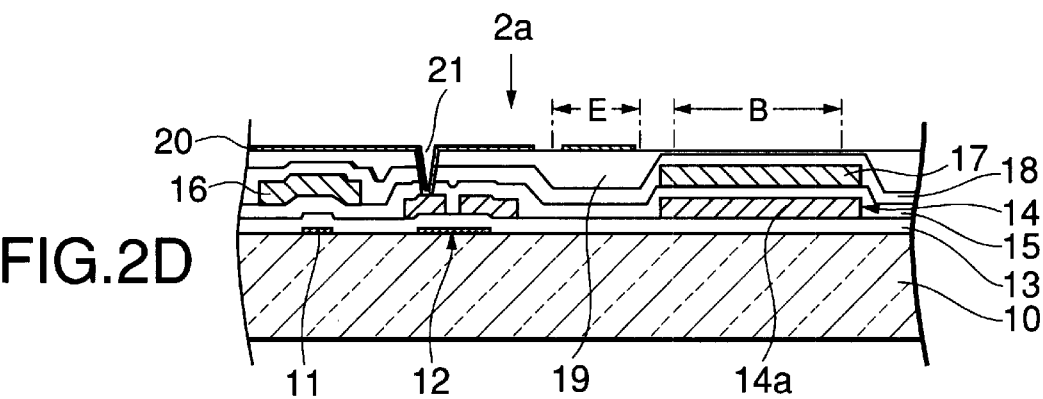

Thereafter, the leveling layer 19 is coated on the patterned surface produced in the manner mentioned above by spin coating. Assuming that the multi-panel method is utilized, the large substrate (not shown) is mounted on a chuck of a spin coating machine (not shown) by vacuum adhesion. The large substrate is coated with a leveling layer material (such as acrylic resin) having predetermined viscosity by supplying the material to the pattern forming surface of the large substrate while rotating the large substrate at a predetermined speed. The leveling layer material spreads uniformly on the pattern forming surface of the large substrate by centrifugal force to paint it uniformly. In this state, since the height of the underlying layer of the leveling layer 19 is increased by a value corresponding to the thickness of the bottom-up pattern 17 in the seal area B as shown in FIG. 2C, a reduced amount of the leveling layer material is deposited on the seal area B, so that the leveling layer 19 formed on the seal area B is very thin. Assuming, for example, that the large substrate is rotated at rotation speed of 1400 rpm for 20 seconds, the thickness of the leveling layer formed on the pixel portion becomes about 1000 nm, that is, the thickness of the leveling layer formed on the area E shown in FIG. 2D is about 1000 nm, while the thickness of the leveling layer formed on the seal area B becomes about 100 nm. Incidentally, in the conventional array substrate 102, the thickness of the leveling layer formed on the seal area B is about 500 nm.

Then, the leveling layer 19 is hardened by annealing the large substrate having the leveling layer coated at 250° C. for one hour.

Thereafter, the contact holes 21 is formed in the second interlayer insulating layer 18 and the leveling layer 19 on the opening portion 21a formed in the first interlayer insulating layer 15, by etching. The reason for that the opening portion 21a is preliminarily formed in the first interlayer insulating layer 15 in forming the contact hole 21 in this manner is that it is not easy to etch the leveling layer 19, the second interlayer insulating layer 18 and the first interlayer insulating layer 15 in one etching step.

Thereafter, an ITO layer is formed on the leveling layer 19 by sputtering and etched to form the pixel electrode 20, resulting in the structure shown in FIG. 2D. A portion of the pixel electrode is connected to the metal wiring layer 14 exposed through the contact hole 21 and, hence, to the switching element 12.

Referring to FIG. 1 again, the opposing substrates 3 are fabricated on a large substrate. In fabricating the opposing substrates 3, the opposing electrodes 31 are formed by forming an ITO layer on the transparent glass substrates 30 by sputtering and etching the ITO layer.

After the array substrate 2a and the opposing substrate 3 are completed, they are assembled to form the liquid crystal display panel 1a. First, the seal agent 22 is printed along the outer periphery of the display area A on either the array substrate 2a or the opposing substrate 3 (see FIG. 9). The printing is performed by the drawing printing in which the seal agent is supplied continuously by using a seal dispenser or the screen printing. The spacers 23 are preliminarily mixed in the seal agent 22. As the seal agent 22, an ultraviolet ray setting resin or a thermosetting resin is mainly used.

After the seal printing, the array substrate 2a and the opposing substrate 3 are overlapped each other. First, the array substrates 2a in the large substrate and the opposing substrates 3 in the large substrate are overlapped each other and positioned such that cells corresponding to the array substrates 2a and the opposing substrates 3 oppose each other. Thereafter, the gap between the array substrates 2a and the opposing substrates 3 is regulated to a desired value by pressing the array substrates 2a and the opposing substrates 3 together by a pressing plate to exert a pressure on the seal agent 22 and the spacers 23. In this state, the seal agent 22 is hardened. When the ultraviolet ray setting resin is used as the seal agent, a ultraviolet ray transparent plate is used as the pressing plate and the seal agent 22 is hardened by irradiating the pressing plate with ultraviolet ray. When the thermosetting resin is used as the seal agent, the seal agent 22 is hardened by heating the pressing plate by a heater equipped therein or by putting the liquid crystal panel in an oven and heating environmental gas within the oven.

In the case of the conventional array substrate 102, when pressure is exerted on the spacers 23 by pressing the array substrate 2a and the opposing substrate 3 together by the pressing plate, there may be a case where the spacers 23 sink into the leveling layer 19, which is formed on the seal area B and is 500 nm thick, by about 200 nm partially, causing the cell gap to be uneven.

In the case of the liquid crystal display panel 1a according to the first embodiment, however, the leveling layer 19 formed on the seal area B of the array substrate 2a is as very thin as about 100 nm, as mentioned previously. Therefore, it is possible to restrict the sink amount of the spacers to several tens nm throughout the unit substrate or throughout the large substrate to thereby improve the uniformity of the cell gap and the yield of the liquid crystal display panel. Incidentally, the cell gap is about 4 µm.

Thereafter, the large substrate is cut to discrete unit substrates as the liquid crystal display panels 1a and the display panels are processed through the predetermined steps, resulting in the final products.

Now, an embodiment of the bottom-up pattern 17 of the liquid crystal display panel 1a according to the first embodiment will be described with reference to FIG. 3A to FIG. 3C, which are plan views showing a relation between the bottom-up pattern 17, the lead wiring lines 14a and the seal area B in the region C shown in FIG. 1, which corresponds to the cross section taken along a line C1–C2 in FIG. 3A.

Figure 3A:
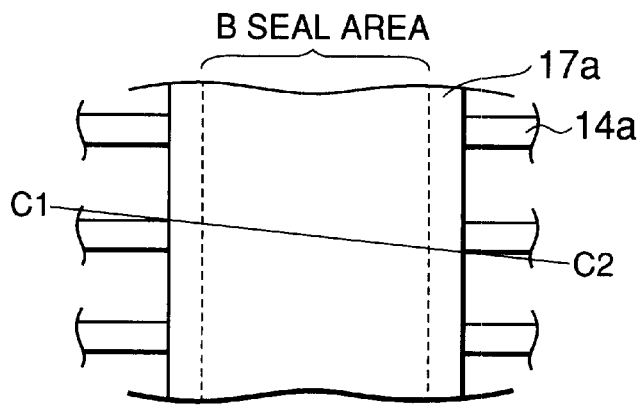
FIG. 3A to FIG. 3C are plan views of a bottom-up pattern 17, lead wiring lines 14a and a seal area B, showing relations thereof in an area C shown in FIG. 1.
Figure 3B:
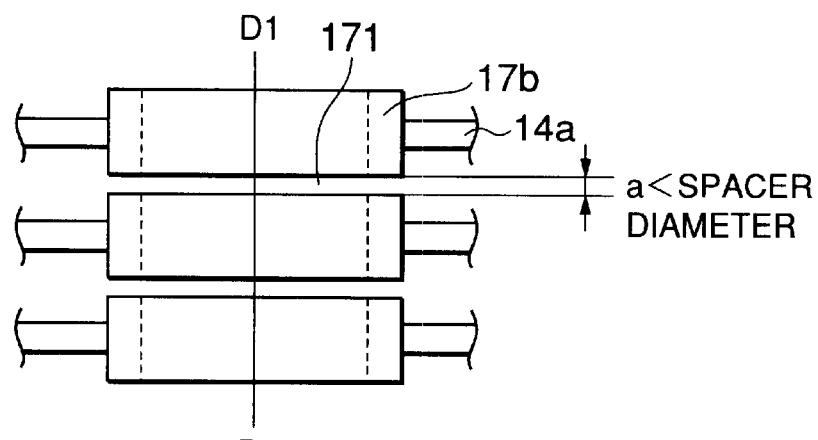
Figure 3C:
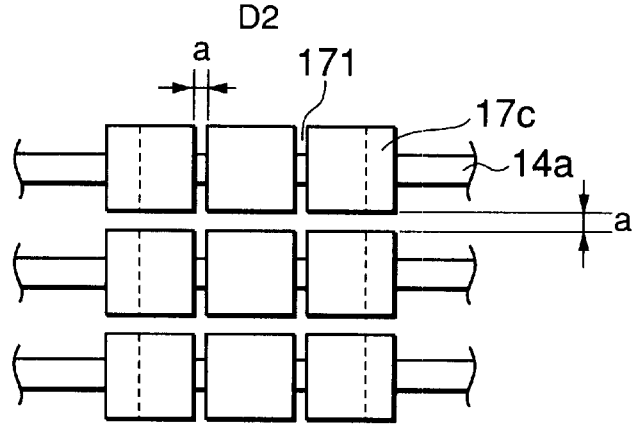

As shown in FIG. 3A to FIG. 3C, a plurality of parallel lead wiring lines 14a are provided such that the wiring lines traverse the seal area B and bottom-up patterns 17a, 17b and 17c are formed on the seal area B.

The bottom-up pattern 17a shown in FIG. 3A is an embodiment of the bottom-up pattern 17 and has no slit portion. This embodiment may be used in a case where there is no severe problem of electric short-circuit due to the bottom-up pattern 17.

The bottom-up pattern 17b shown in FIG. 3B is another embodiment of the bottom-up pattern 17, in which the aluminum wiring layer in the same level as that of the light shield 16 is separated in a gap area between the adjacent aluminum lead wiring lines 14a. This embodiment is effective to prevent electric short-circuit due to the bottom-up pattern 17 to thereby improve the reliability of insulation.

The bottom-up pattern 17c shown in FIG. 3C is a further embodiment of the bottom-up pattern 17, in which a lattice-patterned slit 171 is formed in the aluminum wiring layer in the same level as that of the light shield 16 to divide the aluminum wiring layer into a plurality of discrete lands.

Width a of the slit 171 in the pattern 17b shown in FIG. 3B as well as the pattern 17c shown in FIG. 3C is smaller than diameter of the spacer 23, so that the sink of the spacer 23 into the leveling layer 19 is restricted even in the gap area of the bottom-up pattern 17b. Therefore, it is possible to make the gap uniform throughout the seal area B to thereby improve the uniformity of the cell gap. Further, it is possible to effectively function an increased number of spacers as the gap retaining members to thereby further improve the uniformity of the cell gap.

Next, other embodiments of the bottom-up pattern 17 of the liquid crystal display panel 1a according to the first embodiment will be described with reference to FIG. 4A and FIG. 4B, which show cross sections taken along a line D1–D2 in FIG. 3B.

Figure 4A:
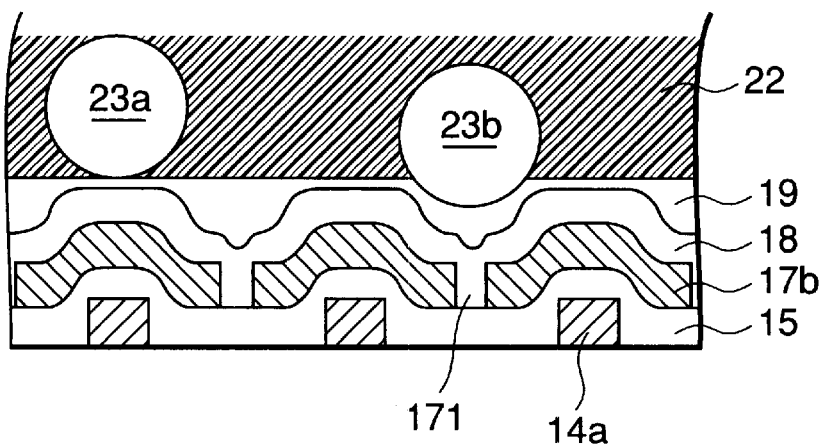
FIG. 4A and FIG. 4B are cross sections taken along a line D1–D2 in FIG. 3B.

As shown in FIG. 4A, on the lead wiring lines 14a, the first interlayer insulating layer 15, the bottom-up pattern 17b, the second interlayer insulating layer 18 and the leveling layer 19 are formed in the order. On the leveling layer 19, spacers 23a and 23b mixed in the seal agent 22 are mounted. The spacers 23a and 23b are sandwiched between the array substrate 2a and the opposing substrate 3 under pressure. The lead wiring line 14a is positioned below the spacer 23a. Since the bottom level of the leveling layer 19 is high, the sink amount of the spacer 23a into the leveling layer 19 is relatively small. On the contrary, since there is no lead wiring line below the spacer 23b, the bottom level of the leveling layer 19 is low, the sink amount of the spacer 23b into the leveling layer 19 becomes relatively large.

Figure 4B:
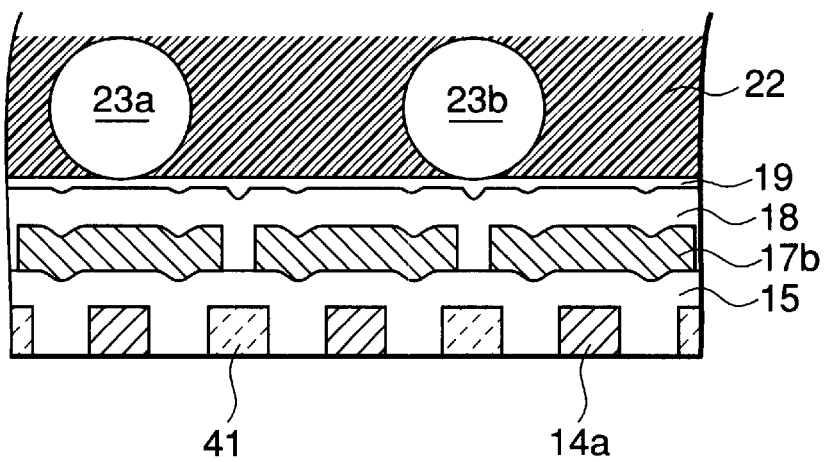

On the other hand, in the construction shown in FIG. 4B, a bottom-up pattern 41 is formed in the gap area between the adjacent lead wiring lines 14a in the same layer as the layer of the lead wiring lines. With such construction, it is possible to keep the spacer 23b in the gap area between the lead wiring lines 14a in substantially the same level as that of the spacer 23a above the lead wiring line 14a. That is, the surface irregularity of the leveling layer caused by the existence of the lead wiring lines 14a is reduced, so that it is possible to improve the flatness of the patterned lamination structure provided on the seal area B to support the spacers. Therefore, it is possible to further improve the uniformity of the vertical level of the spacers to thereby effectively function an increased number of spacers as the gap retaining members and further improve the uniformity of the cell gap. The bottom-up pattern 41 can be applied to not only the construction shown in FIG. 3B but also the construction shown in FIG. 3C.

Embodiment 2

Now, a liquid crystal display panel according to the second embodiment and a fabrication method thereof will be described with reference to FIG. 5, which is a cross section of the liquid crystal display panel 1b according to the second embodiment.

The liquid crystal display panel 1b differs from the liquid crystal display panel 1a according to the first embodiment in that a bottom-up pattern 17 forming an underlying layer of a leveling layer 19 in the seal area B is exposed in a surface of an array substrate 2b and spacers 42 are supported by the exposed surface.

That is, there is no leveling layer 19 in the seal area B and the spacers 42 are in direct contact with the bottom-up pattern 17 of aluminum and supported thereby. Therefore, there is no sink of the spacers 42 into the leveling layer 19 since there is substantially no case where the spacers 42 of a glass material sink into the metal layer of such as aluminum. Consequently, the spacers 42 function as the gap retaining members throughout the small substrate as well as the large substrate, so that the uniformity of the cell gap and the yield of the liquid crystal display panel in the multi-panel production are improved.

In order to make the cell gap of the liquid crystal display panel 1b equal to that of the liquid crystal display panel 1a according to the first embodiment, the diameter of the spacer 42 should be larger than that of the spacer 23.

An example of the fabrication method of the liquid crystal display panel 1b of the second embodiment will be described with reference to FIG. 6A to FIG. 6D, which are cross sections of the wafer in respective fabrication steps of the array substrate 2b according to the second embodiment.

As shown in FIG. 6A, the light shield 16 and the bottom-up pattern 17 are formed in a similar manner to the fabrication method of the liquid crystal display panel 1a of the first embodiment and the leveling layer 19 is formed by the spin coating as shown in FIG. 6B.

Thereafter, the contact holes 21 are formed by etching away portions of the second interlayer insulating layer 18 and the leveling layer 19 on the opening portion 21a formed in the first interlayer insulating layer 15 and portions of the second interlayer insulating layer 18 and the leveling layer 19 on the seal area B are removed by etching (FIG. 6C). That is, the leveling layer coated on the seal area B is etched in the etching step for forming the contact hole 21. Describing this in more detail, after a SiN layer is formed by CVD and the second interlayer insulating layer 18 is formed, a photo resist is coated thereon, exposed and developed. When the photo resist is of the positive type, a portion of the photo resist on the seal area B is exposed. When the photo resist is of the negative type, the portion of the photo resist is not exposed. Thereafter, the exposed photo resist is developed to form a resist pattern (not shown) for forming the contact hole in the seal area B. The leveling layer 19 and the second interlayer insulating layer 18 are etched by using the thus formed resist pattern as a mask.

As a result, the surface of the bottom-up pattern 17, which is in the same layer as that of the light shield 16, is exposed in the seal area B.

The fabrication steps subsequent thereto are the same as those in the fabrication method of the liquid crystal display panel 1a of the first embodiment.

Figure 7A:
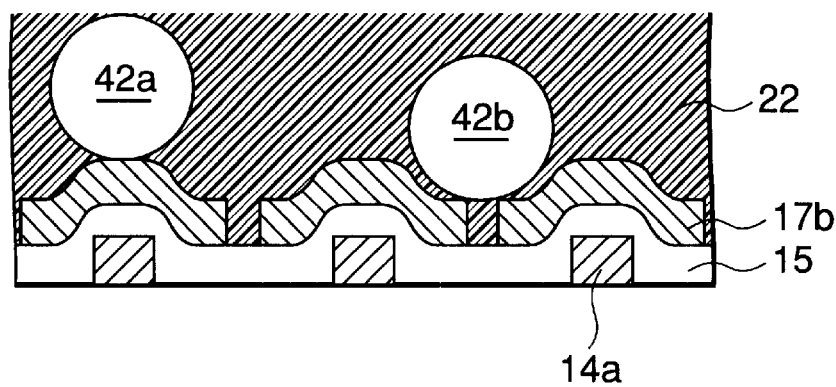
FIG. 7A and FIG. 7B are cross sections taken along a line D1–D2 in FIG. 3B.

The bottom-up pattern 17 of the liquid crystal display panel 1b of the second embodiment may be formed as shown in FIG. 3A to FIG. 3C (the cross section taken along the line C1–C2 shown in FIG. 3A corresponds to the region C shown in FIG. 5). In the second embodiment, the seal agent 22 adheres to the bottom-up pattern directly, as shown in FIG. 5. Therefore, when the pattern of the discrete lands such as the bottom-up pattern 17c shown in FIG. 3C is employed, the seal agent 22 enters into the lattice slits as shown in FIG. 7A. This is advantageous in that the adhesiveness of the seal is improved.

Figure 7B:
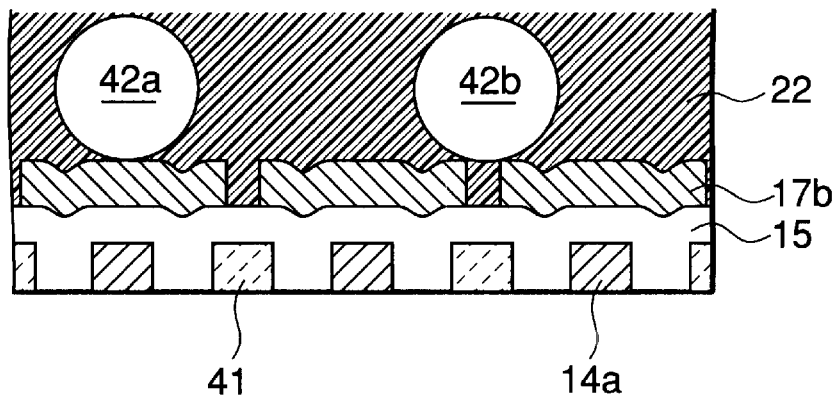

Furthermore, as shown in FIG. 7B, it may be possible to form the bottom-up pattern 41 in the gap between the adjacent lead wiring lines 14a in the same layer as that of the lead wiring lines 14a. In the latter case, it is possible to hold the spacer 42b on the gap area between the adjacent lead wiring lines 14a in substantially the same level as that of the spacer 42a on the lead wiring line 14a. That is, as will be clear from a comparison of FIG. 7A with FIG. 7B, the irregularity of the surface of the bottom-up pattern 17b caused by the lead wiring lines 14a is relaxed so that the surface of the lamination pattern formed on the seal area B and supporting the spacers 42 can be more flat.

Therefore, it becomes possible to make the level of the spacers in every portion more uniform. Consequently, it is possible to effectively function an increased number of spacers 42 as the gap retaining members, so that the uniformity of the cell gap is improved. The bottom-up pattern 41 can be applied to any of the bottom-up patterns 17a, 17b and 17c shown in FIG. 3A, FIG. 3B and FIG. 3C, with similar effect.

Embodiment 3

Next, a liquid crystal display panel according to the third embodiment of the present invention and a fabrication method thereof will be described with reference to FIG. 8, which is a cross section of the liquid crystal display panel 1c of the third embodiment.

The liquid crystal display panel 1c differs from the liquid crystal display panel 1b of the second embodiment in that the first interlayer insulating layer 15, which is an underlying layer of a leveling layer 19 in a seal area B, is exposed in a surface of an array substrate 2c and spacers 43 are in contact with the exposed surface and supported thereby. That is, the third embodiment can be realized by not forming the bottom-up pattern 17 in the fabrication method of the liquid crystal display panel 1b of the second embodiment.

Therefore, there is no leveling layer 19 provided in the seal area B and the spacers 43 formed of a glass material are in direct contact with the first interlayer insulating layer 15 formed of SiN and supported thereby. In the third embodiment, there is no sink of the spacers 43 into the leveling layer 19 and there is substantially no sink thereof into the SiN interlayer insulating layer 15. Therefore, the spacers 43 function as the gap retaining members throughout the small substrate as well as the large substrate, so that the uniformity of the cell gap and the yield of the liquid crystal display panel in the multi-panel production are improved.

In order to make the cell gap of the liquid crystal display panel 1c of the third embodiment equal to the cell gap of the liquid crystal display panel 1b of the second embodiment, it is necessary to select the spacer 43 having diameter larger than that of the spacer 42.

In the liquid crystal display panel including an array substrate having a leveling layer, pixel electrodes formed on the leveling layer and switching elements electrically connected to the pixel electrodes through contact holes, an opposing substrate having an opposing electrode opposing the pixel electrodes and piled on the array substrate through a seal provided around a display area of the panel with a gap between the array substrate and the opposing substrate being retained by spacers mixed in the seal, the present invention resides in that the leveling layer formed of a soft material on the seal area is thinned or removed by the existing patterning process and the surface of the seal area on the array substrate is made hard and uniform, as described hereinbefore. Therefore, the spacers can effectively function as the gap retaining members throughout the liquid crystal display panel, so that it is possible to improve the uniformity of the cell gap to thereby effectively produce the liquid crystal display panels having high display quality.

Furthermore, even in the multi-panel production method, the influence of the leveling layer in the seal area is reduced or removed, so that the variation of cell gap of every liquid crystal display panel is restricted, causing the yield thereof to be improved.

What is claimed is:

1. A liquid crystal display panel comprising:
    an array substrate having a switching element array;
    an opposing substrate opposing to said array substrate;
    a liquid crystal layer disposed between said array substrate and said opposing substrate;
    a seal member sealing said liquid crystal layer within said display panel;
    a spacer disposed within said seal member so as to make a gap between said array substrate and said opposing substrate constant; and
    a leveling layer formed on said switching element array, said leveling layer being provided with one of an opening area and a thin region at a seal area of said seal member, said thin region being thinner than thickness of said leveling layer on each switching element of said switching element array.

2. A liquid crystal display panel as claimed in claim 1, wherein, said leveling layer is provided with said thin area at said seal area such that a bottom-up pattern layer for making a level of an underlying layer of said leveling layer higher is disposed under said seal area.

3. A liquid crystal display panel as claimed in claim 1, wherein, said leveling layer is provided with said thin area at said seal area such that a level of an underlying layer of said leveling layer is made substantially equal to a level of a surface of said leveling layer.

4. A liquid crystal display panel as claimed in claim 1, wherein said leveling layer is provided with said opening area at said seal area such that an underlying layer of said leveling layer is exposed at said opening area whereby said spacers are made in contact with said underlying.

5. A liquid crystal display panel as claimed in claim 2, wherein said bottom-up pattern layer is formed of an electrically conductive material, a plurality of parallel lead wiring lines traversing said seal area are provided in a layer in a level of the layer including said bottom-up pattern and an interlayer insulating layer and portions of said bottom-up pattern in gaps between said lead wiring lines are removed.

6. A liquid crystal display panel as claimed in claim 5, wherein a width of said gap is smaller than a diameter of said spacer.

7. A liquid crystal display panel as claimed in claim 5, wherein said bottom-up pattern layer is formed in gap areas of said lead wiring lines in the same layer as that of said lead wiring layer.

8. A liquid crystal display panel as claimed in claim 2, further comprising a wiring layer formed in a level of said electrodes of said switching elements and a light shield formed on the first interlayer insulating layer formed on said wiring layer and said electrodes of said switching element, wherein said pixel electrodes are formed on said leveling layer, each said pixel electrode is electrically connected to one of said electrodes of each said switching element through one of contact holes formed in said leveling layer and said bottom-up pattern is formed on said first interlayer insulating layer.

9. A liquid crystal display panel as claimed in claim 8, wherein said bottom-up pattern is in the same layer as that of said light shield.

10. A liquid crystal display panel as claimed in claim 2, wherein said leveling layer is formed of a material having hardness lower than those of said spacers and said underlying layer of said leveling layer.

11. A liquid crystal display panel as claimed in claim 4, wherein a bottom-up pattern for raising a level of said underlying layer is formed in said seal area of said array substrate.

12. A liquid crystal display panel as claimed in claim 11, wherein said seal member is adhered to said bottom-up pattern layer and said bottom-up pattern layer is formed with slits.

13. A liquid crystal display panel as claimed in claim 12, wherein a width of said slit is smaller than the diameter of said spacer.

14. A liquid crystal display panel as claimed in claim 8, wherein said bottom-up pattern is in the same level as that of a laminated pattern layer formed on a display area in the vicinity of said switching element.

15. A liquid crystal display panel as claimed in claim 8, wherein a thickness of said thinner portion of said leveling layer is smaller than that of a portion of said leveling layer on said light shield.

16. A fabrication method for fabricating a liquid crystal display panel, comprising:

patterning steps of forming at least switching elements, wiring lines and a light shielding layer on a transparent substrate;

leveling layer coating step of forming a leveling layer on a surface of a wafer on which the patterns are formed in the patterning steps by coating;

step of forming pixel electrodes on said leveling layer;

step of providing a seal containing spacers in mixed state; and step of forming a bottom-up pattern layer for increasing height of an underlying layer of said leveling layer in said seal area of said transparent substrate.

17. A fabrication method as claimed in claim 16, further comprising a step of removing a portion of said leveling layer, which is coated on said seal area by etching.

18. A fabrication method as claimed in claim 16, further comprising a step of forming said contact holes in said leveling layer by etching before said pixel electrode is formed.

19. A fabrication method as claimed in claim 18, further comprising the step of etching said leveling layer coated on said seal area by a etching step of forming said contact holes.

20. A fabrication method as claimed in claim 16, wherein said bottom-up pattern layer is formed by any one of patterning steps.

* * * * *

UNITED STATES PATENT AND TRADEMARK OFFICE
CERTIFICATE OF CORRECTION

| | | |
|---|---|---|
| PATENT NO. | : 6,549,259 B2 | Page 1 of 1 |
| APPLICATION NO. | : 09/780382 | |
| DATED | : April 15, 2003 | |
| INVENTOR(S) | : Yuko Sato and Mitsuhiro Sugimoto | |

It is certified that error appears in the above-identified patent and that said Letters Patent is hereby corrected as shown below:

Under REFERENCES CITED at (56):

Add the following references:
KR10-1999-0037022
KR10-1999-0036908

Signed and Sealed this
Twenty-third Day of August, 2011

David J. Kappos
*Director of the United States Patent and Trademark Office*